(12) United States Patent  
Stephenson et al.

(10) Patent No.: US 8,015,788 B2
(45) Date of Patent: Sep. 13, 2011

(54) HEAT TRANSFER SYSTEM FOR TURBINE ENGINE USING HEAT PIPES

(75) Inventors: Justin P. Stephenson, Cincinnati, OH (US); Thomas Ory Moniz, Loveland, OH (US); Kattalaicheri Srinivasan Venkataramani, West Chester, OH (US)

(73) Assignee: General Electric Company, Schenectady, NY (US)

( * ) Notice: Subject to any disclaimer, the term of this patent is extended or adjusted under 35 U.S.C. 154(b) by 885 days.

(21) Appl. No.: 11/616,555

(22) Filed: Dec. 27, 2006

(65) Prior Publication Data

US 2008/0159852 A1 Jul. 3, 2008

(51) Int. Cl.
 *F02C 7/047* (2006.01)
(52) U.S. Cl. .............. 60/39.093; 415/114; 415/175; 415/178
(58) Field of Classification Search ......... 60/39.093; 415/108, 114, 175, 176, 177, 178
See application file for complete search history.

(56) References Cited

U.S. PATENT DOCUMENTS

| | | | |
|---|---|---|---|
| 3,917,193 A * | 11/1975 | Runnels, Jr. ............ 244/207 |
| 3,965,681 A | 6/1976 | Wyczalek et al. |
| 4,186,559 A | 2/1980 | Decker et al. |
| 4,199,300 A | 4/1980 | Tubbs |
| 4,207,027 A | 6/1980 | Barry et al. |
| 4,218,179 A | 8/1980 | Barry et al. |
| 4,240,257 A | 12/1980 | Rakowsky et al. |
| 4,419,044 A | 12/1983 | Barry et al. |
| 4,688,745 A * | 8/1987 | Rosenthal ............ 244/134 R |
| 5,046,920 A | 9/1991 | Higashi et al. |
| 5,178,514 A | 1/1993 | Damiral |
| 5,192,186 A | 3/1993 | Sadler |
| 5,228,643 A * | 7/1993 | Manda et al. ............ 244/134 B |
| 5,439,351 A | 8/1995 | Artt |
| 5,878,808 A | 3/1999 | Rock et al. |
| 5,947,425 A * | 9/1999 | Gerster ...................... 248/58 |
| 5,964,279 A | 10/1999 | Mochizuki et al. |
| 5,975,841 A | 11/1999 | Lindemuth et al. |
| 5,979,220 A | 11/1999 | Zombo et al. |
| 6,079,670 A * | 6/2000 | Porte ...................... 244/134 B |
| 6,308,524 B1 | 10/2001 | Mochizuki et al. |
| 6,841,021 B1 * | 1/2005 | Mesing et al. ............ 156/212 |
| 6,990,797 B2 | 1/2006 | Venkataramani et al. |
| 7,040,389 B2 * | 5/2006 | Hsu ............................ 165/185 |
| 2007/0234704 A1 * | 10/2007 | Moniz et al. ............ 60/39.093 |
| 2008/0053100 A1 * | 3/2008 | Venkataramani et al. ...... 60/772 |

FOREIGN PATENT DOCUMENTS

GB 2136880 A 9/1984
* cited by examiner

*Primary Examiner* — Edward Look
*Assistant Examiner* — Ryan H Ellis
(74) *Attorney, Agent, or Firm* — Trego, Hines & Ladenheim, PLLC

(57) ABSTRACT

A heat transfer system is provided for a turbine engine of the type including an annular inlet cowling. The heat transfer system includes at least one heat pipe disposed in contact with an interior of the casing. The heat pipe is thermally coupled to a heat source, such that heat from the heat source can be transferred through the heat pipe and into the inlet cowling.

19 Claims, 5 Drawing Sheets

HEAT TRANSFER SYSTEM FOR TURBINE ENGINE USING HEAT PIPES

BACKGROUND OF THE INVENTION

This invention relates generally to turbine engines, and more particularly to a system and method using heat pipes for transferring heat within a gas turbine engine.

In gas turbine engines, especially high bypass turbine engines, exposed components such as the splitter nose and booster inlet guide vane (IGV) leading edges can accumulate ice during operation. Ice accumulation within the engine and over exposed engine structures may be significant. The accereted ice may partially block the fan flowpath and render the fan unstable. The accumulated ice can also be suddenly shed, for example through continued operation of the engine, a throttle burst from lower power operation to higher power operation, or vibrations due to either turbulence or asymmetry of ice accretion.

Various prior art methods exist for limiting ice accumulation during engine operation, for example, running the engine with an increased operating temperature, directing high temperature bleed air from the engine compressor to the exposed surfaces, spraying the engine with a deicing solution prior to operation, and heating surfaces using electric resistance heating. However, all of these methods have various disadvantages. The increased operating temperature and the bleed systems may decrease engine performance. Such systems may also require expensive and heavy valves to turn off the flow of the high temperature air during take-off and other high power operations to protect the engine. It has been estimated that the specific fuel consumption (SFC) penalty associated with a bleed air configuration can be as high as 1%. Deicing fluid provides protection for only a limited time. Electrical heating requires large quantities of electricity for performing the de-icing operation and may require additional electrical generators, electrical circuits and complex interaction logic with the airplane's computers with the attendant increased cost, weight and performance penalties.

BRIEF SUMMARY OF THE INVENTION

The above-mentioned shortcomings in the prior art among others are addressed by the present invention, which provides a heat transfer system for a turbine engine including at least one heat pipe having at least a section thereof disposed in contact with an inner surface of a cowling structure. The heat pipe is thermally coupled to a heat source, such that heat from the heat source can be transferred through the heat pipe to the cowling structure.

According to one aspect, the invention provides a heat transfer system for a turbine engine including an annular cowling structure with a nose portion having an arcuate cross-section. The heat transfer system includes at least one heat pipe having at least a section thereof disposed in contact with an inner surface of the cowling structure. The heat pipe is secured by a mounting structure including a damping element adapted to isolate the heat pipe from vibrations; wherein the heat pipe is thermally coupled to a heat source, such that heat from the heat source can be transferred through the heat pipe to the cowling structure.

According to another aspect of the invention, a gas turbine engine includes: an annular cowling structure with a nose portion having an arcuate cross-section; a plurality of heat pipes, at least a section of each heat pipe being disposed against an inner surface of the cowling structure, the heat pipe secured by a mounting structure including a damping element adapted to isolate the heat pipe from vibrations; and a heat source thermally coupled to the heat pipes such that heat from the heat source can be transferred through the heat pipes to the cowling structure.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
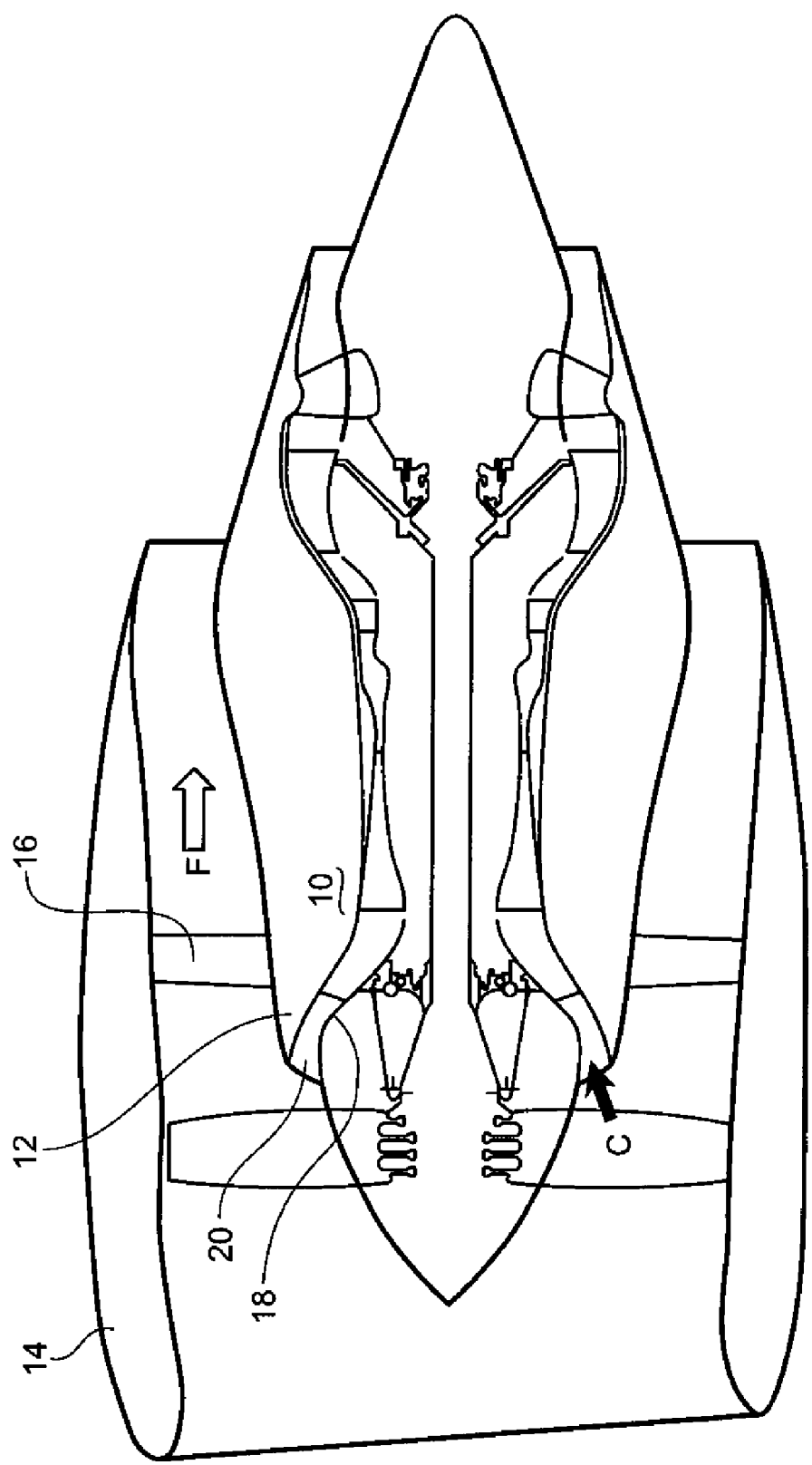
FIG. 1 is a schematic cross-sectional view of a portion of a fan module of a gas turbine engine which includes a heat transfer system constructed in accordance with an aspect of the present invention.
Figure 2:
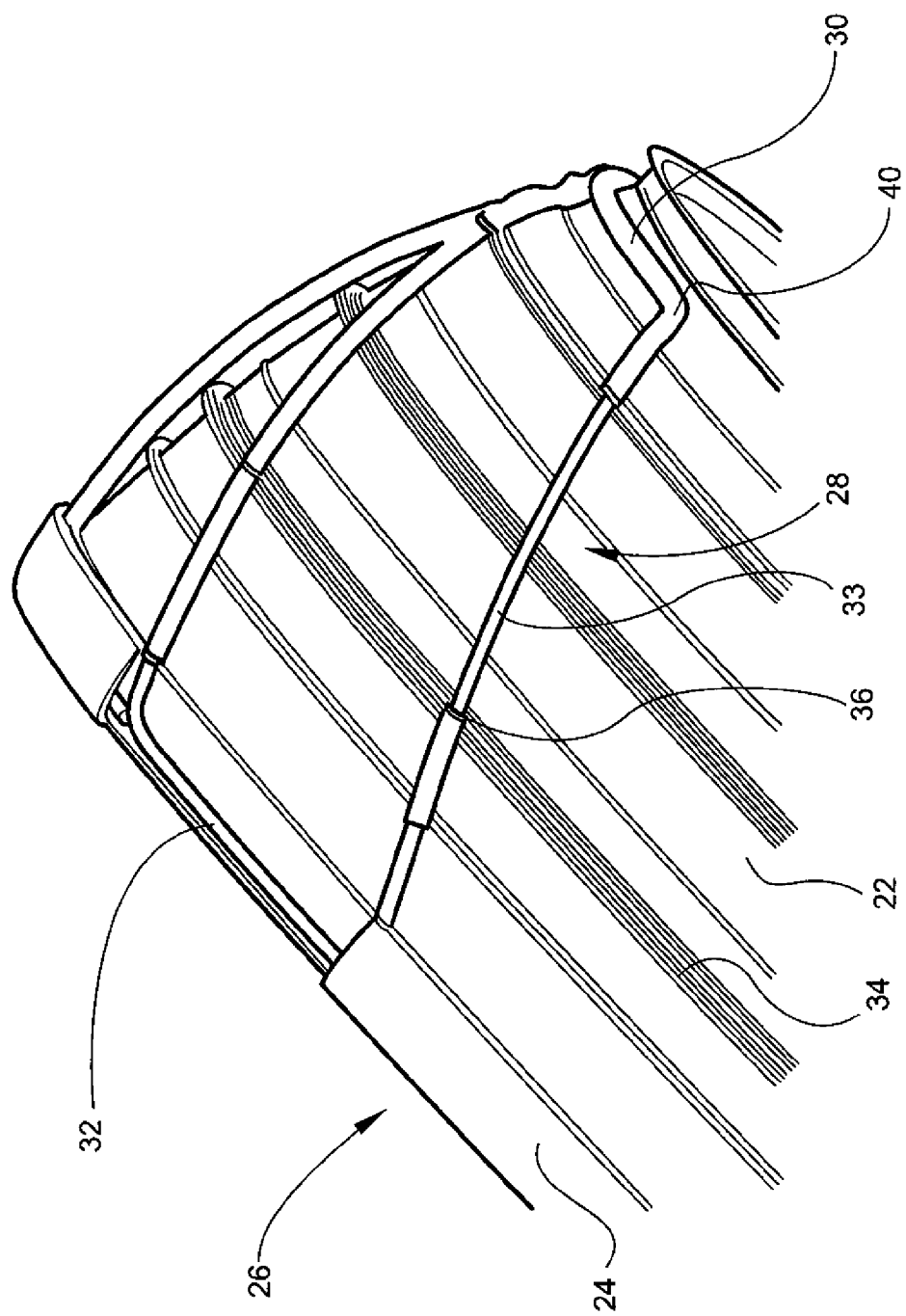
FIG. 2 is a perspective view of a splitter shown in FIG. 1.

Referring to the drawings wherein identical reference numerals denote the same elements throughout the various views, FIG. 1 illustrates a portion of a fan section of a gas turbine engine, including an inner housing 10 with a forward-facing splitter 12, an annular fan casing 14, which is connected to the inner housing 10 by an array of radially extending fan struts 16, and a core inner flowpath 18. The splitter 12 is an annular structure that separates the fan bypass air flow path, indicated generally at "F", and the core engine air flow path, indicated generally at "C". A plurality of inlet guide vanes (IGVs) 20 extend between the splitter 12 and the core inner flowpath 18. The present invention is equally applicable to other engine configurations having a cowling structure with an arcuate "nose" portion, for example pure turbojet engines lacking a conventional fan cowling or splitter. As used herein, the term "cowling structure" refers generally to any static annular engine structure with a nose portion having an arcuate cross-section, As shown in FIG. 2, an annular booster casing 22 forms the radially inner surface of the splitter 12 and serves to contain the rotating booster blades (not shown). An annular lip 24, which may be continuous or segmented, defines the hollow leading edge or "nose" 26 of the splitter 12, in cooperation with the booster casing 22. The present invention may also be used in configurations in which the splitter 12 is made up of more or fewer components. A plurality of heat pipes 28 are mounted around the booster casing 22. Each heat pipe 28 includes an aft section 30, and a forward section 32, with a transition section 33 therebetween. Existing bolts used to connect sections of the booster casing 22 together at flanges 34 may be used to secure mounts 36 which in turn carry the heat pipes 28 in resilient grommets to provide damping. The majority of each of the heat pipes is wrapped with suitable thermal insulation 40 (only a portion of which is shown in FIG. 2) to minimize heat transfer. Each forward section 32, or at least a portion thereof, is uninsulated. The uninsulated portion is designated as a "cold" or "condenser" end, and the opposing end is designated as a "hot" or "evaporator" end (not shown). It should be noted that terms "hot", "evaporator", "cold", and "condenser", when used in relation to the heat pipes 28, describe the positioning of the heat pipes 28 in areas of relatively high or low temperature, and are not related to any particular aspect of the structure of the heat pipes 28 themselves.

The forward sections 32 of the heat pipes 28 are disposed within the splitter nose 26 in a circumferential array. Each forward section 32 is generally arc-shaped to follow the curve of the booster casing 22 and extends in a generally circumferential direction. Each of the forward sections 32 is mounted in the splitter nose 26 so as to achieve good thermal conductivity with the flowpath surface while avoiding vibration and cracking. In the example shown in FIG. 3, the forward section 32 is held against the interior surface of the splitter lip 24 by one or more curved, resilient spring clips 42 which are welded, bolted, riveted, or otherwise attached to the booster casing 22. A damping member 44, which may have thermal insulation properties, may be carried by the clip 42 or disposed between the clip 42 and the forward section 32. An example of a suitable material for the damping member 44 is high-temperature silicone. Optionally, a thermally conductive thermal paste, such as silicone paste of a known type, may be disposed between the forward section 32 and the inner surface 46 of the splitter lip 24 to enhance and direct heatflow to the front. Additional thermal insulation (not shown) may be placed inside the splitter lip 24 to cover the back side of the forward section 32 and minimize heat loss.

Figure 4:
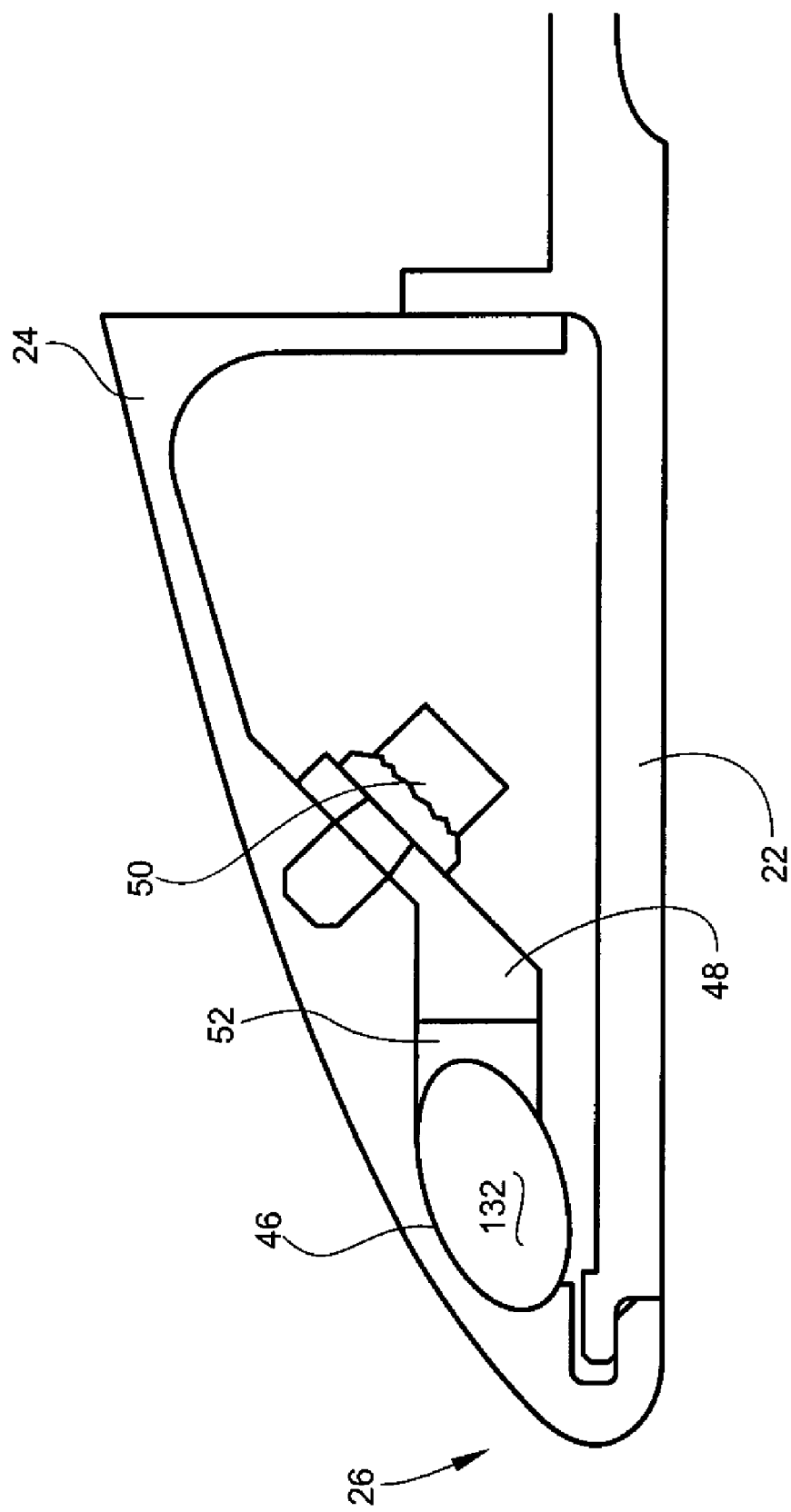
FIG. 4 is a cross-sectional view of a splitter showing an alternative mounting of a heat pipe.

In the alternative example shown in FIG. 4, forward sections 132 of heat pipes, similar to heat pipes 28, are held against the inner surface of the splitter lip 24 by one or more brackets 48 which are attached to the splitter lip 24, for example with bolts 50 as shown. A damping member 52, which may have thermal insulation properties, may be disposed between the bracket 48 and the forward section 132. An example of a suitable material for the damping member 52 is high-temperature silicone. Optionally, a thermally conductive thermal paste, such as silicone paste of a known type, may be disposed between the forward section 132 and the inner surface of the splitter lip 24 to enhance and direct heatflow to the front. Additional thermal insulation (not shown) may be placed inside the splitter lip 24 to cover the back side of the forward section 132 and minimize heat loss.

Figure 5:
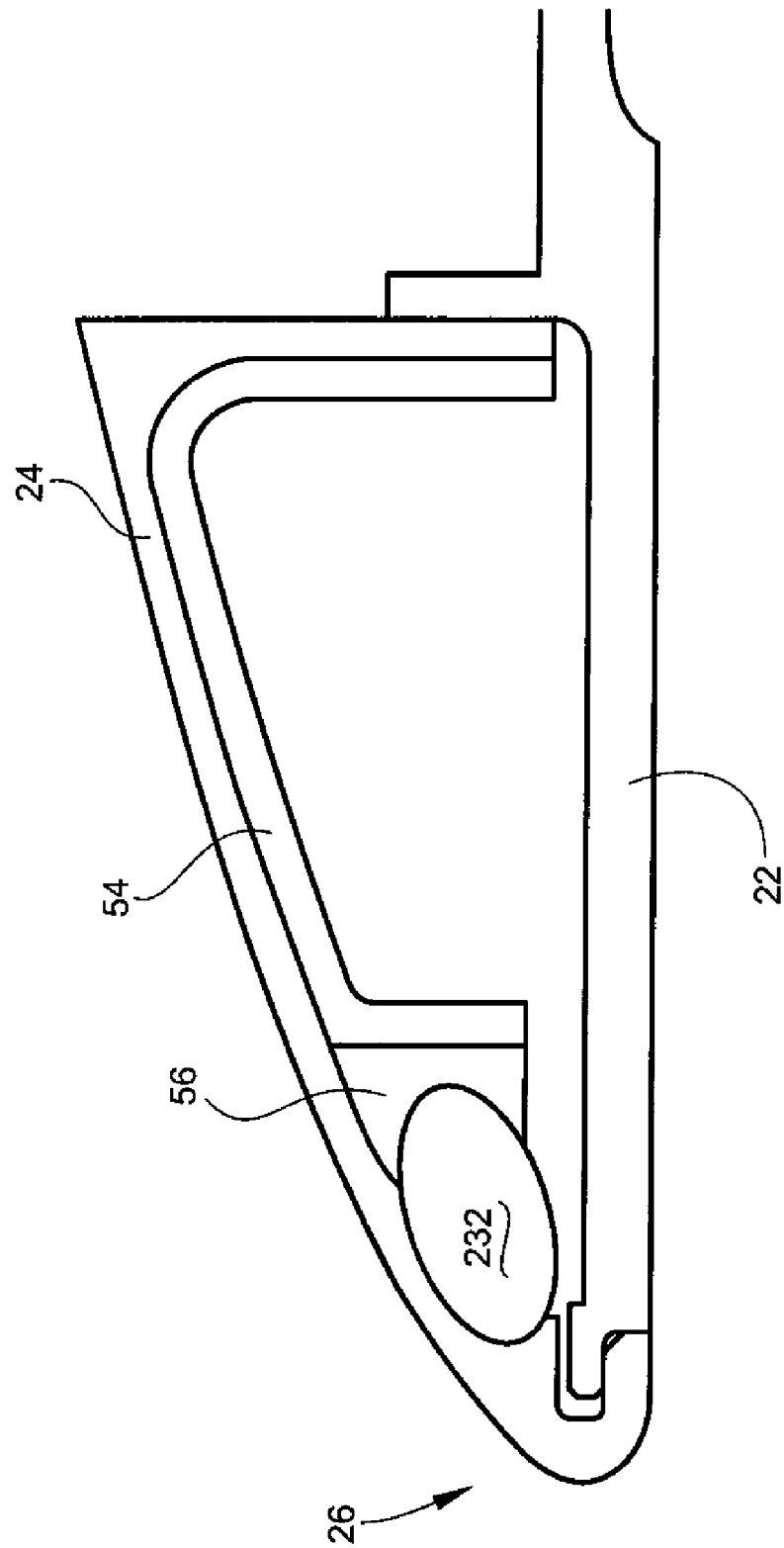
FIG. 5 is a cross-sectional view of a splitter showing another alternative mounting of a heat pipe therein.

In the alternative example shown in FIG. 5, forward sections 232 of heat pipes, similar to heat pipes 28, are held against the inner surface of the splitter lip 24 by one or more relatively thin brackets 54 (e.g. sheetmetal) which are captured inside the splitter lip 24. A damping member 56, which may have thermal insulation properties, may be disposed between the bracket 54 and the forward section 232. An example of a suitable material for the damping member 56 is high-temperature silicone. Optionally, a thermally conductive thermal paste, such as silicone paste of a known type, may be disposed between the forward section 232 and the inner surface of the splitter lip 24 to enhance and direct heatflow to the front. Additional thermal insulation (not shown) may be placed inside the splitter lip 24 to cover the back side of the forward section 232 and minimize heat loss.

Referring again to FIG. 2, the transition section 33 extends generally axially and interconnects the aft section 30 and the forward section 32. It size and shape depends on the positioning of the associated forward section 32, but most of the transition sections 33 will extend in a circumferential direction to some extent.

The aft sections 30 of the heat pipes 28 are generally circumferentially extending. They extend to a heat exchanger (not shown) mounted in a convenient location. The heat exchanger may simply be a housing with an open interior. Oil from the engine's lubrication system enters the heat exchanger through appropriate piping, transfers heat to the heat pipes 28, and then flows back to the engine's lubrication system through a supply line. The oil storage, circulation, and distribution system connected to the heat exchanger is conventional within the gas turbine engine art, and not discussed here. If desired, the heat exchanger could be connected to another type of heat source, such as a bleed air line, an electric source, or another fluid system within the engine.

Figure 3:
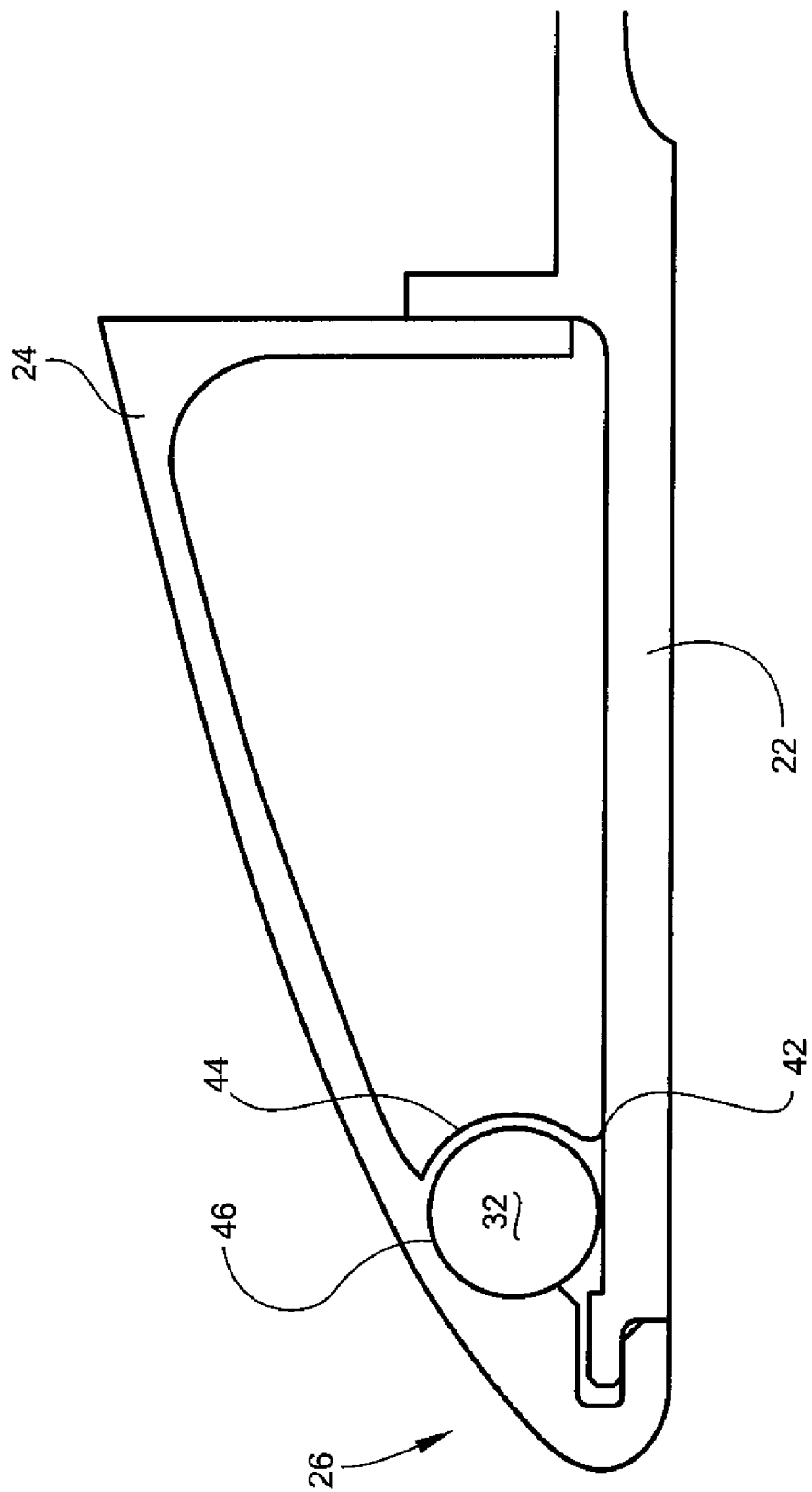
FIG. 3 is a cross-sectional view of the splitter of FIG. 2 showing a heat pipe disposed therein.

While shown as circular in FIG. 3, the portion of the heat pipes 28 that lie inside the splitter nose 26 may be formed into oval, flatted, or other non-circular cross-sectional shapes to accommodate a desired cross-sectional area while improving volumetric packaging or heat transfer. For example, FIGS. 4 and 5 illustrate heat pipes having generally oval cross-sections.

Each heat pipe 28 has an elongated outer wall with closed ends which together define a cavity. The cavity is lined with a capillary structure or wick (not shown) and holds a working fluid. Various working fluids, such as gases, water, organic substances, and low-melting point metals are known for use in heat pipes. The working fluid may be non-flammable so as to avoid introducing a fire hazard into the area of the fan casing 10 in the event of a leak or break in the heat pipe 28.

The heat pipes 28 are highly efficient at transferring heat. For example, their effective thermal conductivity is several orders of magnitude higher than that of solid copper. The number, length, diameter, shape, working fluid, and other performance parameters of the heat pipes are selected based on the desired degree of heat transfer during engine operation. The operation of the heat pipes 28 are described in more detail below.

If necessary, the characteristics of the heat pipes 28, especially their forward sections 32, may be varied to accommodate their individual orientation. For example, a heat pipe 28 with a substantially horizontal forward section 32, or a heat pipe 28 with a vertical forward section 32 extending upwardly, may require a design providing stronger capillary action to ensure adequate condensate return, than a heat pipe 28 with its forward section 32 extending downwardly.

In operation, oil which has absorbed heat from various parts of the engine is circulated into the heat exchanger where it heats the hot or evaporator ends of the heat pipes 28. The working fluid within the heat pipes 28 absorbs that heat and evaporates. The vapor generated then travels through the cavities, and condenses at the cold portions or ends of the heat pipes 28, thereby transferring heat to the cold portions or ends. A wick or other capillary structure that extends from one end of the heat pipe 28 to the other transports the condensed liquid back to the hot portions or hot ends by capillary action, thereby completing the circuit. The resultant heat transfer to the splitter 12 is effective to prevent ice formation (i.e. anti-icing) and/or remove ice which has formed on the splitter 12 (i.e. de-icing), depending on the heating rate.

The heat transfer system described herein, being passive, needs no valves and is sealed. The number, size, and location of the heat pipes 28 can be selected to provide heat removal and transfer as needed. Depending upon the exact configuration chosen, the system performance may be used only for anti-icing or for de-icing. The heat transfer system makes use of heat which is undesired in one portion of an engine and uses that heat where it is need in another portion of the engine, avoiding both the losses associated with prior art cooling systems and the need for a separate anti-icing heat source.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A heat transfer system for a turbine engine including an annular cowling structure with a nose portion having an arcuate cross-section, the heat transfer system comprising:
    a plurality of heat pipes circumferentially mounted in a spaced-apart relation around an inner surface of the cowling structure, each of the plurality of heat pipes including an aft section, a forward section, and a transition section therebetween, wherein the aft and transition sections are wrapped in thermal insulation and the forward section is uninsulated, wherein forward sections of each of the plurality of heat pipes are arranged within and thermally coupled to the cowling structure in a circumferential array, and wherein the forward section of each heat pipe is mounted to the inner surface of the cowling structure by way of a mounting structure including a damping element;
    wherein the plurality of heat pipes are thermally coupled to a heat source, such that heat from the heat source can be transferred through the heat pipes to the cowling structure.

2. The heat transfer system of claim 1 wherein the cowling structure includes:
    an annular casing; and
    a splitter lip having an arcuate cross-sectional shape disposed at a forward end of the casing so as to define a splitter nose in cooperation with the casing.

3. The heat transfer system of claim 2 wherein the mounting structure includes at least one bracket attached to the casing and securing the heat pipe against an inner surface of the splitter nose, the bracket carrying the damping element in contact with the heat pipe.

4. The heat transfer system of claim 1 further including a thermally conductive paste disposed between the heat pipe and the inner surface of the cowling structure.

5. The heat transfer system of claim 1 wherein the forward and aft sections of each of the plurality of heat pipes are generally circumferentially extending relative to the annular cowling structure, and the transition sections of each of the plurality of heat pipes are generally axially extending relative to the annular cowling structure.

6. The heat transfer system of claim 1 wherein the plurality of heat pipes are disposed in contact with the interior of the cowling, and each of the heat pipes are thermally coupled to the heat source.

7. The heat transfer system of claim 1 wherein each of the plurality of heat pipes includes:
    a first end connected to the heat source;
    an uninsulated portion disposed at a distal end of the heat pipe; and
    an insulated portion disposed between the first end and the uninsulated portion.

8. The heat transfer system of claim 1 wherein each of the plurality of heat pipes includes an elongated outer wall with closed ends cooperatively defining a cavity that contains a working fluid.

9. The heat transfer system of claim 1 wherein the heat transfer system facilitates at least one of preventing ice formation on the cowling and removing ice which has formed on the cowling.

10. The heat transfer system of claim 1 wherein the heat source is engine oil from the turbine engine.

11. The heat transfer system of claim 1 wherein each of the plurality of heat pipes has a non-circular cross-sectional shape.

12. A gas turbine engine including:
    an annular cowling structure with a nose portion having an arcuate cross-section;
    a plurality of heat pipes circumferentially mounted in a spaced-apart relation around an inner surface of the cowling structure, each of the plurality of heat pipes including an aft section, a forward section, and a transition section therebetween, wherein the aft and transition sections are wrapped in thermal insulation and the forward section is uninsulated, wherein forward sections of each of the plurality of heat pipes are arranged within and thermally coupled to the cowling structure in a circumferential array, and wherein the forward section of each heat pipe is mounted to the inner surface of the cowling structure by way of a mounting structure including a damping element; and
    a heat source thermally coupled to the heat pipes such that heat from the heat source can be transferred through the heat pipes to the cowling structure.

13. The heat transfer system of claim 12 wherein the cowling structure includes:
    an annular casing; and
    a splitter lip having an arcuate cross-sectional shape disposed at a forward end of the casing so as to define a splitter nose in cooperation with the casing.

14. The heat transfer system of claim 13 wherein the mounting structure includes at least one bracket attached to the casing and securing the heat pipe against an inner surface of the splitter nose, the bracket carrying the damping element in contact with the heat pipe.

15. The heat transfer system of claim 12 further including a thermally conductive paste disposed between the heat pipes and the inner surface of the cowling structure.

16. The heat transfer system of claim 12 wherein the forward and aft sections of each of the plurality of heat pipes are generally circumferentially extending relative to the annular cowling structure, and the transition sections of each of the plurality of heat pipes are generally axially extending relative to the annular cowling structure.

17. The heat transfer system of claim 12 wherein each heat pipe includes:
    a first end connected to the heat source;
    an uninsulated portion disposed at a distal end of the heat pipe; and
    an insulated portion disposed between the first end and the uninsulated portion.

18. The gas turbine engine of claim 12 wherein each heat pipe includes an elongated outer wall with closed ends cooperatively defining a cavity that contains a working fluid.

19. The gas turbine engine of claim 12 wherein the heat pipes facilitate at least one of preventing ice formation on the cowling structure and removing ice which has formed on the cowling structure.

* * * * *